United States Patent
Liu et al.

(10) Patent No.: US 11,143,906 B1
(45) Date of Patent: Oct. 12, 2021

(54) REFLECTIVE LCD PANEL

(71) Applicant: HANNSTAR DISPLAY CORPORATION, Taipei (TW)

(72) Inventors: Ding-Wei Liu, Kaohsiung (TW); Meng-Ju Li, Tainan (TW); Wei-Chih Hsu, Taichung (TW); Chen-Hao Su, Taichung (TW); Sung-Chun Lin, Tainan (TW); Chia-Hua Yu, New Taipei (TW)

(73) Assignee: HANNSTAR DISPLAY CORPORATION, Taipei (TW)

( * ) Notice: Subject to any disclaimer, the term of this patent is extended or adjusted under 35 U.S.C. 154(b) by 0 days.

(21) Appl. No.: 17/204,980

(22) Filed: Mar. 18, 2021

(30) Foreign Application Priority Data

Mar. 18, 2020 (CN) .......................... 202010191547.X

(51) Int. Cl.
*G02F 1/1335* (2006.01)

(52) U.S. Cl.
CPC .. *G02F 1/133553* (2013.01); *G02F 1/133514* (2013.01); *G02F 1/133536* (2013.01)

(58) Field of Classification Search
CPC ................................................ G02F 1/133553
See application file for complete search history.

(56) References Cited

U.S. PATENT DOCUMENTS

| 2007/0013773 A1* | 1/2007 | Tsuchiya ........... G02F 1/134363 348/87 |
| 2009/0213311 A1* | 8/2009 | Hisakado .......... G02F 1/133634 349/117 |

* cited by examiner

*Primary Examiner* — Edmond C Lau
(74) *Attorney, Agent, or Firm* — McClure, Qualey & Rodack, LLP

(57) ABSTRACT

A reflective LCD panel includes a color filter substrate, an array substrate, a liquid crystal layer and a polarizing film. The array substrate and the color filter substrate are disposed oppositely. The liquid crystal layer is disposed between the color filter substrate and the array substrate and has an alignment direction. The polarizing film is disposed on the color filter substrate, and color coordinates of the polarizing film in the CIE1976 color space are (a, b), wherein $0.05 \leq a \leq 0.2$ and $-5 \leq b \leq 0$. The liquid crystal layer has a birefringence difference $\Delta n$, the liquid crystal layer has a thickness (d), when the reflective LCD panel is in a white frame, $2\Delta n^* d = \Delta \lambda$ is satisfied, $\Delta \lambda$ is the optical path difference obtained when a forward light vertically enters the liquid crystal layer and is reflected by the array substrate, and $120 \text{ nm} \leq \Delta n^* d \leq 170 \text{ nm}$.

10 Claims, 3 Drawing Sheets

REFLECTIVE LCD PANEL

This application claims the benefit of People's Republic of China application Serial No. 202010191547.X, filed Mar. 18, 2020, the subject matter of which is incorporated herein by reference.

BACKGROUND OF THE INVENTION

Field of the Invention

The invention relates in general to a liquid crystal display (LCD) panel, and more particularly to a reflective LCD panel.

Description of the Related Art

Liquid crystal is an anisotropic material between liquid state and solid state. Since liquid crystal molecules are very sensitive to environmental factors such as electric field, magnetic field, sound field and temperature, physical characteristics of the liquid crystal molecules, such as birefringence difference ($\Delta n$) and dielectric anisotropic ($\Delta \varepsilon$), are adjustable.

When light wave propagates along a long axis of the liquid crystal molecules, the electric field vibration direction of the light wave is perpendicular to the long axis and the light wave is referred to as "an ordinary ray", and the refractive index (no) is referred to as an "ordinary refractive index". Therefore, the direction of the long axis of the liquid crystal molecular is referred to as "an optical axis". When the propagation direction of light wave is not parallel to the optical axis, the electric field component of the light wave may be perpendicular or parallel to the optical axis. The light wave whose electric field component is perpendicular to the optical axis is an ordinary ray having a refractive index ($n_o$), but the light wave whose electric field component is parallel to the optical axis has a different light wave speed from that of the ordinary ray and is referred to as "an extraordinary ray" having a refractive index ($n_e$) referred to as an "extraordinary refractive index". The difference between the extraordinary refractive index $n_e$ and the ordinary refractive index $n_o$ is represented by $\Delta n = n_e - n_o$ ($\Delta n$ is referred to as a birefringence difference). Let a horizontally aligned liquid crystal box be taken for example. In a static state when no electric field is applied to the liquid crystal box, and the liquid crystal molecules are parallel to the substrate ($\theta = 0°$). Meanwhile, the electric field of the light wave is parallel to the optical axis, and an effective refractive index $n_e$ is sensed by the light signal. When an electric field perpendicular to the substrate is applied to the liquid crystal box, the long axis of the positive liquid crystal molecules ($\Delta\varepsilon > 0$) tends to be parallel to the electric field. Therefore, as the intensity of the electric field increases, the tilt angle of the liquid crystal molecules also increases ($\theta > 0°$), and the effective refractive index gradually reduces from $n_e$ to $n_o$.

Besides, polarizers are optical elements that have been widely used in the liquid crystal display. The polarizer allows the light wave in a single polarization direction to pass through and absorbs the light wave perpendicular to the single polarization direction. The polarizer determines whether the light wave in a specific polarization direction will pass through or not and therefore determines whether the liquid crystal panel will be in a bright state (white state) or a dark state (black state).

Currently, a polarizer is disposed on the reflective LCD panel and is used to convert a natural light into a polarized light. The polarizer further controls the transmittance of the polarized light to show an image on the display panel. However, since the reflective light is susceptible to the angle of the liquid crystal molecules and the thickness (cell gap) of the liquid crystal layer, an unexpected optical path difference will be generated, making the colour hue of current reflective LCD panel yellowish. The yellowish hue of the reflective LCD panel needs to be resolved.

SUMMARY OF THE INVENTION

The invention is directed to a reflective LCD panel. Through the selection of the polarizing film, the birefringence difference of the liquid crystal and the thickness of the liquid crystal layer, the parameters of the LCD panel match the parameters of the polarizing film and the reflective LCD panel with better white balance is provided.

According to one embodiment of the present invention, a reflective LCD panel, including a color filter substrate, an array substrate, a liquid crystal layer and a polarizing film, is provided. The array substrate and the color filter substrate are disposed oppositely. The liquid crystal layer is disposed between the color filter substrate and the array substrate and has an alignment direction. The polarizing film is disposed on the color filter substrate, and color coordinates of the polarizing film in the CIE1976 color space are (a, b), wherein $0.05 \leq a \leq 0.2$, $-5 \leq b \leq 0$. The liquid crystal in the liquid crystal layer has a birefringence difference $\Delta n$, the liquid crystal layer has a thickness d, and when the reflective LCD panel is in a white frame, $2\Delta n^* d = \Delta\lambda$ is satisfied, wherein $\Delta\lambda$ is defined as an optical path difference obtained when a forward light vertically enters the liquid crystal layer and is reflected by the array substrate, wherein $120 \text{ nm} \leq \Delta n^* d \leq 170 \text{ nm}$.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements.

According to an embodiment of the present invention, a reflective LCD panel is provided. The liquid crystal in the liquid crystal layer has a birefringence difference $\Delta n$, the liquid crystal layer has a thickness d, $120 \text{ nm} \leq \Delta n^* d \leq 170 \text{ nm}$, and the white balance can be optimized by adjusting the chroma of the polarizing film monomer.

Figure 1:
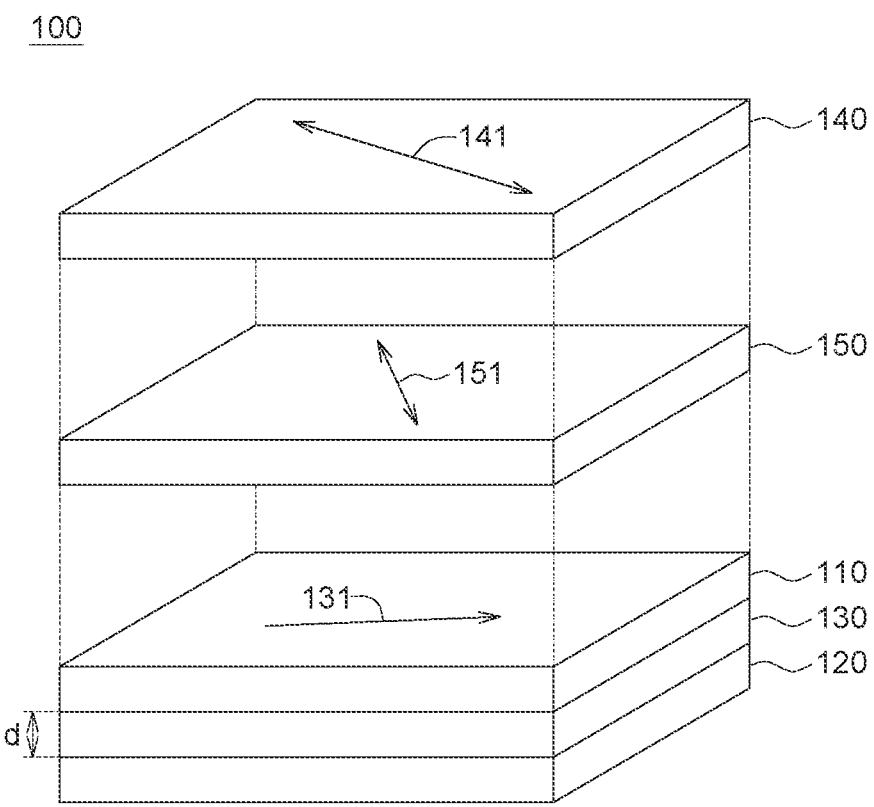
FIG. 1 is an explosion diagram of a reflective LCD panel according to an embodiment of the present invention.
Figure 2:
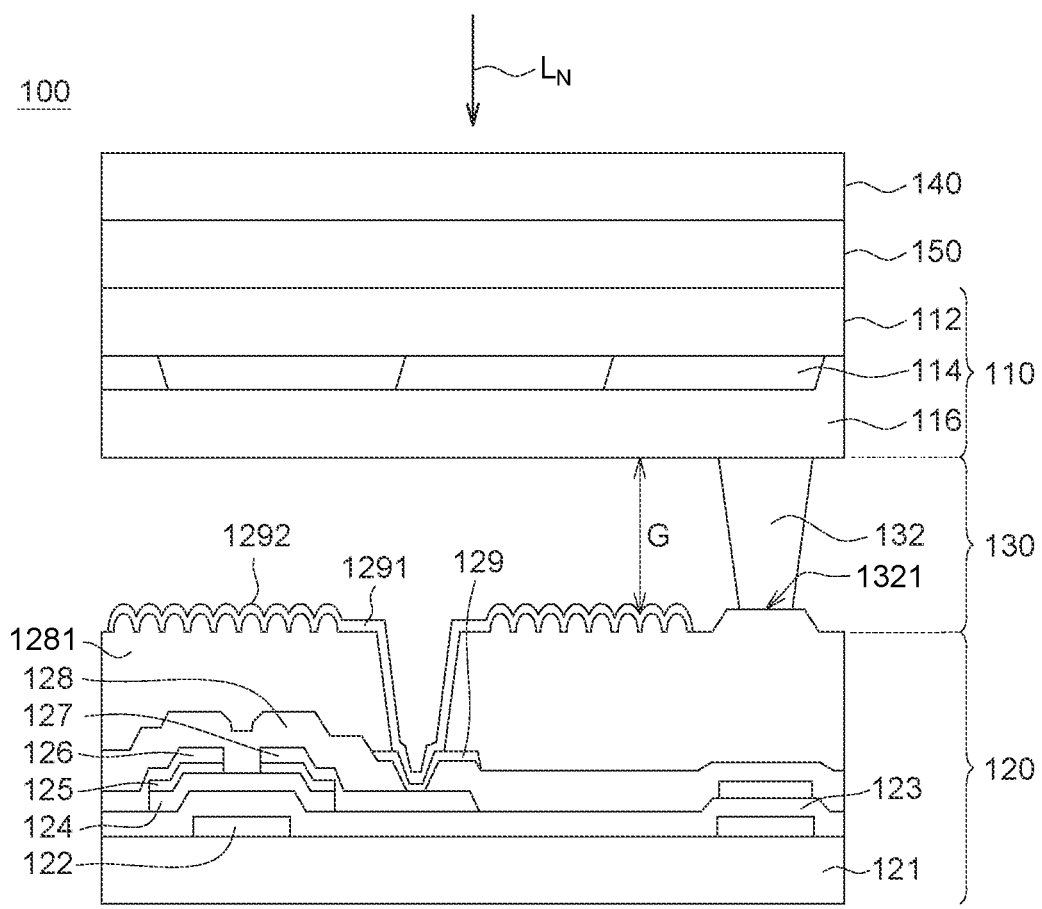
FIG. 2 is a cross-sectional view of a reflective LCD panel according to an embodiment of the present invention.

Referring to FIG. 1 and FIG. 2, an explosion diagram and a cross-sectional view of a reflective LCD panel 100 according to an embodiment of the present invention are respectively shown. The reflective LCD panel 100 includes a color filter substrate 110, an array substrate 120, a liquid crystal layer 130 and a polarizing film 140. The array substrate 120 and the color filter substrate 110 are disposed oppositely. The liquid crystal layer 130 is disposed between the color filter substrate 110 and the array substrate 120 and has an alignment direction 131. The polarizing film 140 is disposed on the color filter substrate 110. Additionally, the reflective LCD panel 100 may further include a retardation film 150 disposed between the color filter substrate 110 and the polarizing film 140.

A plurality of red, green and blue color filters, each corresponding to a pixel on the reflective LCD panel 100, are formed on a glass substrate 112 of the color filter substrate 110. After a natural light (white light) passes through the pixels, the natural light is converted into three primary colors, namely a red light, a green light and a blue light. Details of the above conversion are as follows. Firstly, a light shielding layer is formed on the glass substrate 112 to form a black matrix. Next, the red, green and blue (RGB) color filter films 114 are formed (the arrangement of the shape, size and hue of the color filter films depend on the purpose of the LCD panel). Then, a flat protection layer 116 is coated on the color filter films. Lastly, a transparent conductive film (such as indium tin oxide (ITO), not shown in the figures) is sputtered on the protection layer 116 to form a common electrode.

The thin-film transistor (TFT) array is formed on the glass substrate 121 of the array substrate 120. Let FIG. 2 be taken for example. The manufacturing process of the TFT array mainly includes cleaning, film formation, exposure, and development, and then several yellow light etching processes are used to form desired patterns, such as the gate 122, the gate insulation layer 123, the channel layer 124, the ohmic contact layer 125, the source electrode 126, the drain electrode 127, the passivation layer 128, the covering layer 1281, and the conductive layer 129. The passivation layer 128 can be formed of an inorganic material, and the covering layer 1281 can be formed of an organic material, but the present invention is not limited thereto. Moreover, a reflective electrode 1291 can further be disposed on the covering layer 1281 of the array substrate 120 to reflect the light passing through the polarizing film 140 and the color filter substrate 110. The manufacturing method of the array substrate 120 including the following steps. Firstly, the gate 122, the scan line and the common line are formed in the glass substrate 121. The scan line is electrically connected to the gate 122, and the scan line and the common line are separated from each other. Next, the gate insulation layer 123 is formed on the glass substrate 121 and is disposed on the gate 122, wherein the gate insulation layer 123 is formed of an inorganic material (such as silicon oxide, silicon nitride, silicon oxynitride) or other suitable material. Additionally, a semiconductor layer (channel layer 124) is formed on the gate insulation layer 123. The semiconductor layer can be formed of a metal oxide semiconductor, polycrystalline silicon, amorphous silicon or other suitable semiconductor material, and the metal oxide semiconductor material can be indium gallium zinc oxide (IGZO), zinc oxide (ZnO), tin oxide (SnO), indium zinc oxide (IZO), gallium zinc oxide (GZO), zinc tin oxide (ZTO) or indium tin oxide (ITO). Then, the ohmic contact layer 125 is formed on a semiconductor layer and exposes a part of the semiconductor layer. Then, the data line is formed on the glass substrate 121, and the source electrode 126 and the drain electrode 127 are formed on the ohmic contact layer 125, such that the thin-film transistor can form in a pixel structure of the reflective LCD panel 100 and can be electrically connected to the reflective electrode 1291 or connected to reflective electrode 1291 via the conductive layer 129. Besides, the covering layer 1281 can have a bumped surface on which the reflective electrode 1291 is located. The reflective electrode 1291 has a bump structure 1292 and is disposed between the array substrate 120 and the liquid crystal layer 130 to reflect the light. The reflective electrode 1291 can be an opaque conductive layer formed of a metal (silver or aluminum), and has a thickness between 1500 Å and 2500 Å, but the present invention is not limited thereto.

The liquid crystal layer 130 is disposed between the color filter substrate 110 and the array substrate 120, and has an alignment direction 131. In an embodiment, the liquid crystal has a birefringence difference $\Delta n$ of 0.072, the liquid crystal layer 130 has a thickness (d) between 1.7 μm and 2.35 μm, and 120 nm$\leq\Delta n^*d\leq$170 nm. Also, a photo spacer 132 is interposed between the color filter substrate 110 and the array substrate 120 to form a gap G. In addition, the cover layer 1281 may have a trapezoidal surface at a position corresponding to the photo spacer 132, and the surface 1321 of the photo spacer 132 facing the array substrate 120 may be in contact with the trapezoidal surface of the cover layer 128. The photo spacer 132 can maintain the gap G within a predetermined range (such as 2.05±0.1 μm or between 1.7 μm and 2.3 μm), such that the thickness d of the liquid crystal layer 130 can be controlled within the predetermined range.

In an embodiment, the liquid crystal layer 130 is an electrically controlled birefringence (ECB) liquid crystal, an optical coupling type liquid crystal or an optical memory type liquid crystal. The value of $\Delta n^*d$ still can be set to different ranges. Refer to FIG. 2. After a forward light $L_N$ vertically enters the liquid crystal layer 130, the reflective LCD panel 100 is in a white frame. Then, the forward light $L_N$ is reflected by the array substrate 120 and generates an optical path difference $\Delta\lambda$, which needs to meet the condition: $2\Delta n^*d=\Delta\lambda$.

Moreover, the polarizing film 140 is disposed on the color filter substrate 110, and color coordinates of the polarizing film in the CIE1976 color space are (a, b), wherein $0.05\leq a\leq 0.2$ and $-5\leq b\leq 0$, but the present invention is not limited thereto. The polarizing film 140 converts a non-polarized light into a polarized light. The polarizing film 140 has a transmittance between 43% and 47%, and the absorption axis 141 of the polarizing film 140 forms an angle greater than or equal to 135° and less than or equal to 145° with respect to the alignment direction 131 of the liquid crystal layer 130. The polarizing film 140 can be formed of polyvinyl alcohol (PVA) or a liquid crystal material doped with dyes. PVA can be formed of saponified polyvinyl acetate. In some embodiments, polyvinyl acetate can be formed of vinyl acetate monomers or copolymers of vinyl acetate and other monomer. Examples of other monomers disclosed above include unsaturated carboxylic acid, olefin, unsaturated sulfonic acid or vinyl ether. The manufacturing method of the polarizing film 140 may include swelling treatment, dyeing treatment, cross-linking treatment and washing treatment. The film stretching treatment can be performed prior to or during the cross-linking treatment. Lastly, the film is processed with a dry treatment.

Furthermore, a retardation film 150 can be disposed between the color filter substrate 110 and the polarizing film 140, and a slow axis 151 of the retardation film 150 forms an angle greater than or equal to 105° and less than or equal to 115° with respect to the alignment direction 131 of the liquid crystal layer 130. In an embodiment, the retardation film 150 is a ¼ wave plate and has a phase difference greater than or equal to 170 nm, and less than or equal to 176 nm. The retardation film 150 (¼ wave plate) and the polarizing film 140 can be combined to form a round polarizer, which avoids the reflection of the natural light, for enhancing the contrast.

To resolve the yellowish hue of current reflective LCD panels, through the selection of Δn*d, that is, the polarizing film 140, the birefringence difference Δn of the liquid crystal and the thickness d of the liquid crystal layer 130, the present embodiment makes the parameters of the LCD panel match the parameters of the polarizing film 140 and provides the reflective LCD panel 100 with better white balance.

Referring to the table below, relations between the value Δn*d of the liquid crystal layer 130 and the color coordinates (x, y) obtained when the reflective LCD panel 100 is in a white frame are listed. The color coordinates (x, y) are exemplified by the XY-plane color coordinates in the CIE1930 color space. When white balance is achieved, the X-axis color coordinate is represented by 0.278≤x≤0.320, and the Y-axis color coordinate is represented by 0.298≤y≤0.354. In an embodiment, the color coordinates (x,y) preferably are within an interval of (0.3±0.015, 0.33±0.015).

| Δn * d (unit: nm) | X-axis color coordinate | Y-axis color coordinate |
| --- | --- | --- |
| 122.40 | 0.278 | 0.298 |
| 126.00 | 0.281 | 0.302 |
| 129.60 | 0.285 | 0.306 |
| 133.20 | 0.288 | 0.311 |
| 136.80 | 0.291 | 0.315 |
| 140.40 | 0.294 | 0.319 |
| 144.00 | 0.298 | 0.324 |
| 147.60 | 0.301 | 0.328 |
| 151.20 | 0.304 | 0.332 |
| 154.80 | 0.307 | 0.337 |
| 158.40 | 0.310 | 0.341 |
| 162.00 | 0.314 | 0.345 |
| 165.60 | 0.317 | 0.350 |
| 169.20 | 0.320 | 0.354 |

Figure 3:
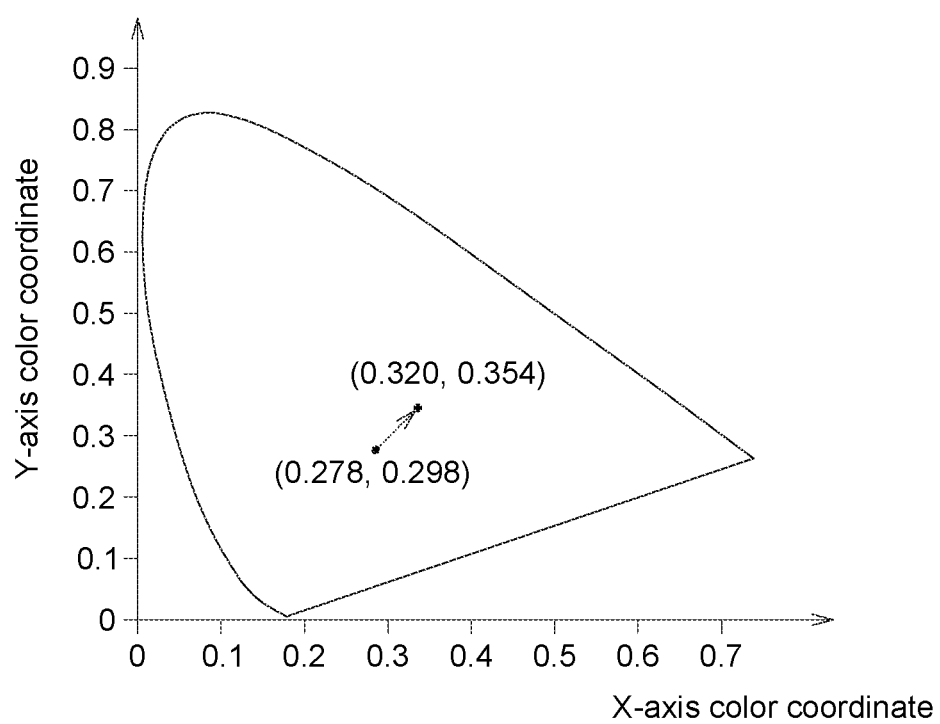
FIG. 3 is a schematic diagram of color coordinates when the reflective LCD panel is in a white frame.

Referring to FIG. 3, a schematic diagram of color coordinates (x, y) obtained when the reflective LCD panel is in a white frame is shown. In an embodiment, the color coordinates (x, y) increase as Δn*d increases. For example, when the liquid crystal layer 130 meets the condition of Δn*d=122.40 nm and the reflective LCD panel is in a white frame, the color coordinates (x, y) are (0.278, 0.298), which indicates that the blue wavelength occupies a larger portion of the white light mixed by the RGB. When the liquid crystal layer 130 meets the condition of Δn*d=169.20 nm and the reflective LCD panel is in a white frame, the color coordinates (x, y) are (0.320, 0.354), which indicates that the yellow wavelength occupies a larger portion of the white light mixed by the RGB. As the value Δn*d of the liquid crystal layer 130 increases, the color coordinates (x, y) would also increase from bottom left to the top right (as indicated by the arrow sign). Thus, by changing the Δn*d value of the liquid crystal layer 130, the color coordinates (x, y) can be correspondingly adjusted.

When the reflective LCD panel 100 in a white frame is yellowish, it can be reasonably inferred that the portion of yellow wavelength in the white light mixed by the RGB increases and generates a color shift, and the coordinates (x, y) in the CIE 1930 color space will be slightly shifted from the white color toward the yellow color. Since human eyes are more sensitive to yellow color than green color, the viewer will feel the white frame yellowish. In the present embodiment, when color coordinates of the polarizing film 140 are set at (a, b), wherein 0.05≤a≤0.2 and −5≤b≤0, in the CIE1976 color space, the value Δn*d of the liquid crystal layer 130 can be set to 147.60 nm, meanwhile, the color coordinates (x, y) can be controlled at (0.301, 0.328) when the reflective LCD panel 100 is in a white frame, such that the display panel can achieve the best white balance and avoid color shift.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A reflective LCD panel, comprising:
a color filter substrate;
an array substrate opposite to the color filter substrate;
a liquid crystal layer disposed between the color filter substrate and the array substrate and having an alignment direction; and
a polarizing film disposed on the color filter substrate, wherein color coordinates of the polarizing film in the CIE1976 color space are (a, b), wherein 0.05≤a≤0.2 and −5≤b≤0,
wherein the liquid crystal in the liquid crystal layer has a birefringence difference Δn, the liquid crystal layer has a thickness d, and when the reflective LCD panel is in a white frame, 2Δn*d=Δλ is satisfied, wherein Δλ is defined as an optical path difference obtained when a forward light vertically enters the liquid crystal layer and is reflected by the array substrate, and 120 nm≤Δn*d≤170 nm.

2. The reflective LCD panel according to claim 1, wherein when the reflective LCD panel is in the white frame, the color coordinates of the reflective LCD panel in CIE1930 color space are (x, y), wherein x and y increase as Δn*d increases.

3. The reflective LCD pane according to claim 2, wherein 0.278≤x≤0.320, and 0.298≤y≤0.354.

4. The reflective LCD panel according to claim 1, wherein an absorption axis of the polarizing film forms an angle greater than or equal to 135° and less than or equal to 145° with respect to the alignment direction of the liquid crystal layer.

5. The reflective LCD panel according to claim 4, further comprising a retardation film disposed between the color filter substrate and the polarizing film, wherein a slow axis of the retardation film forms an angle greater than or equal to 105° and less than or equal to 115° with respect to the alignment direction of the liquid crystal layer.

6. The reflective LCD panel according to claim 5, wherein the retardation film is a ¼ wave plate.

7. The reflective LCD panel according to claim 5, wherein the retardation film has a phase difference greater than or equal to 170 nm and less than or equal to 176 nm.

8. The reflective LCD panel according to claim 1, further comprising a reflective electrode disposed between the array substrate and the liquid crystal layer.

9. The reflective LCD panel according to claim 8, wherein the reflective electrode has a bump structure.

10. The reflective LCD panel according to claim 1, wherein the liquid crystal layer is an electrically controlled birefringence (ECB) liquid crystal.

* * * * *